(12) United States Patent
Ohyama et al.

(10) Patent No.: US 8,667,129 B2
(45) Date of Patent: Mar. 4, 2014

(54) TERMINAL DIFFERENTIATION SERVER AND NETWORK SYSTEM USING THE SAME

(75) Inventors: Satoshi Ohyama, Hyogo (JP); Masaaki Higashida, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 181 days.

(21) Appl. No.: 13/166,819

(22) Filed: Jun. 23, 2011

(65) Prior Publication Data

US 2011/0320549 A1 Dec. 29, 2011

(30) Foreign Application Priority Data

Jun. 23, 2010 (JP) ................................. 2010-142317

(51) Int. Cl.
*G06F 15/173* (2006.01)
*G06F 15/16* (2006.01)

(52) U.S. Cl.
USPC ............................ 709/224; 709/203; 709/206

(58) Field of Classification Search
USPC .................................. 709/203–206, 216–232
See application file for complete search history.

(56) References Cited

U.S. PATENT DOCUMENTS

| | | | | |
|---|---|---|---|---|
| 6,587,878 B1* | 7/2003 | Merriam | ....................... | 709/224 |
| 6,937,569 B1* | 8/2005 | Sarkar et al. | ................... | 370/238 |
| 7,251,788 B2* | 7/2007 | Meyers | ......................... | 715/799 |
| 7,487,938 B2* | 2/2009 | Brady et al. | ................ | 244/118.5 |
| 7,600,034 B2* | 10/2009 | Nasu et al. | ..................... | 709/232 |
| 7,715,330 B2* | 5/2010 | Denecheau et al. | ........... | 370/255 |
| 7,921,192 B2* | 4/2011 | Durrey et al. | .................. | 709/222 |
| 8,180,887 B2* | 5/2012 | Li et al. | .......................... | 709/224 |
| 2003/0204603 A1* | 10/2003 | Buchanan et al. | ............. | 709/228 |
| 2008/0292312 A1* | 11/2008 | Oron et al. | ....................... | 398/33 |
| 2010/0246405 A1* | 9/2010 | Potkonjak | ....................... | 370/241 |
| 2011/0242522 A1* | 10/2011 | Etkin et al. | .................... | 356/5.01 |
| 2011/0268097 A1* | 11/2011 | Agrawala et al. | .............. | 370/338 |
| 2012/0015669 A1* | 1/2012 | Qin et al. | .................... | 455/456.1 |

FOREIGN PATENT DOCUMENTS

JP       2008-287302 A    11/2008

* cited by examiner

*Primary Examiner* — Yasin Barqadle
(74) *Attorney, Agent, or Firm* — Judge Patent Associates (57) ABSTRACT

Provided is a server including: a storage section for pre-storing information on routes between the server and each of a number of terminals; a transmission/reception section for transmitting/receiving messages to/from the number of terminals; a terminal information acquisition section for acquiring information differentiating the terminals and acquiring delay times for transmission between the server and each of the number of terminals; a transmission distance calculation section for calculating respective transmission distances between the server and the number of terminals, based on the transmission delay times acquired by the terminal information acquisition section; and a terminal installation location identifying section for identifying locations where the number of terminals are installed, based on the differentiating information acquired by the terminal information acquisition section, the transmission distances calculated by the transmission distance calculation section, and the route information stored in the storage section.

11 Claims, 9 Drawing Sheets

| SEAT NUMBER | TRANSMISSION DISTANCE |
|---|---|
| A1 | wA1 |
| B1 | wB1 |
| A2 | wA2 |
| B2 | wB2 |
| A3 | wA3 |
| B3 | wB3 |
| A4 | wA4 |
| B4 | wB4 |

FIG. 6

| MAC ADDRESS | TRANSMISSION DELAY TIME ([ns]) | LLID |
|---|---|---|
| m301 | 59 | i301 |
| m302 | 92 | i302 |
| m303 | 133 | i303 |
| m304 | 30 | i304 |
| m305 | 74 | i305 |
| m306 | 120 | i306 |
| m307 | 46 | i307 |
| m308 | 103 | i308 |

FIG. 7

| SEAT NUMBER | TRANSMISSION DISTANCE | MAC ADDRESS | TRANSMISSION DELAY TIME | LLID |
|---|---|---|---|---|
| A1 | wA1 | m304 | 30 | i304 |
| B1 | wB1 | m307 | 46 | i307 |
| A2 | wA2 | m301 | 59 | i301 |
| B2 | wB2 | m305 | 74 | i305 |
| A3 | wA3 | m302 | 92 | i302 |
| B3 | wB3 | m308 | 103 | i308 |
| A4 | wA4 | m306 | 120 | i306 |
| B4 | wB4 | m303 | 133 | i303 |

FIG. 8

| SEAT NUMBER | MAC ADDRESS | IP ADDRESS |
|---|---|---|
| A1 | m304 | 192.168.1.11 |
| B1 | m307 | 192.168.1.12 |
| A2 | m301 | 192.168.1.21 |
| B2 | m305 | 192.168.1.22 |
| A3 | m302 | 192.168.1.31 |
| B3 | m308 | 192.168.1.32 |
| A4 | m306 | 192.168.1.41 |
| B4 | m303 | 192.168.1.42 |

FIG. 9

TERMINAL DIFFERENTIATION SERVER AND NETWORK SYSTEM USING THE SAME

BACKGROUND OF THE INVENTION

1. Field of the Invention

The present invention relates to servers for differentiating among a plurality of terminals connected via a network, and more specifically relates to servers for identifying locations where each of the plurality of terminals is installed.

2. Description of the Background Art

Passenger transportation vehicles are often equipped with entertainment systems. The entertainment systems provided in the cabins of airplanes are called in-flight entertainment (IFE) systems, and various services are provided to passengers in the airplanes through such entertainment systems.

For example, with respect to contents such as movies and music, a passenger can watch images using a monitor terminal and listened to audio using a pair of headphones, which are allocated to all passenger seats. Generally, the monitor terminal is allocated on the back of the seat in front of a passenger seat, and the pair of headphones is connected to the armrest portion of the passenger seat.

In addition, services are provided to the passengers allowing control of an overhead reading light located above the seat to be turned on or off, calling a flight attendant, and calling another passenger via a telephone, by using a control panel or a remote control unit referred to as a handset which is included in the armrest portion of the seat and which is connected to the monitor terminal described above.

The handset operated by the passenger and the monitor terminal installed in each of the seats are connected to a server via a network. The server distributes the contents such as movies and music, notifies a flight attendant that he or she has been called, or performs the lighting control of the overhead reading lights.

With regard to the service of calling a flight attendant, when notifying a flight attendant that he or she has been called, it is necessary for the server to identify the seat at which the passenger is calling the flight attendant.

In addition, when turning the light of the overhead reading light, the server identifies the seat at which the passenger has operated the remote control unit or the control panel to turn on the overhead reading light allocated at a ceiling portion above the seat. Alternatively, when there is a malfunction in some of the terminals such as the remote control unit and the control panel and when passengers cannot perform any controls, it is necessary for the server to identify the terminals with the malfunction and immediately deal with the malfunction.

Therefore, in order to attain service functions as described above, it is necessary to identify the seat of a subject (passenger) who is requesting the service by operating the monitor terminal and the handset (or the location at which the operated monitor terminal is installed).

One conventional example of such a type of network system is disclosed in Japanese Laid-Open Patent Publication No. 2008-287302.

Figure 9:
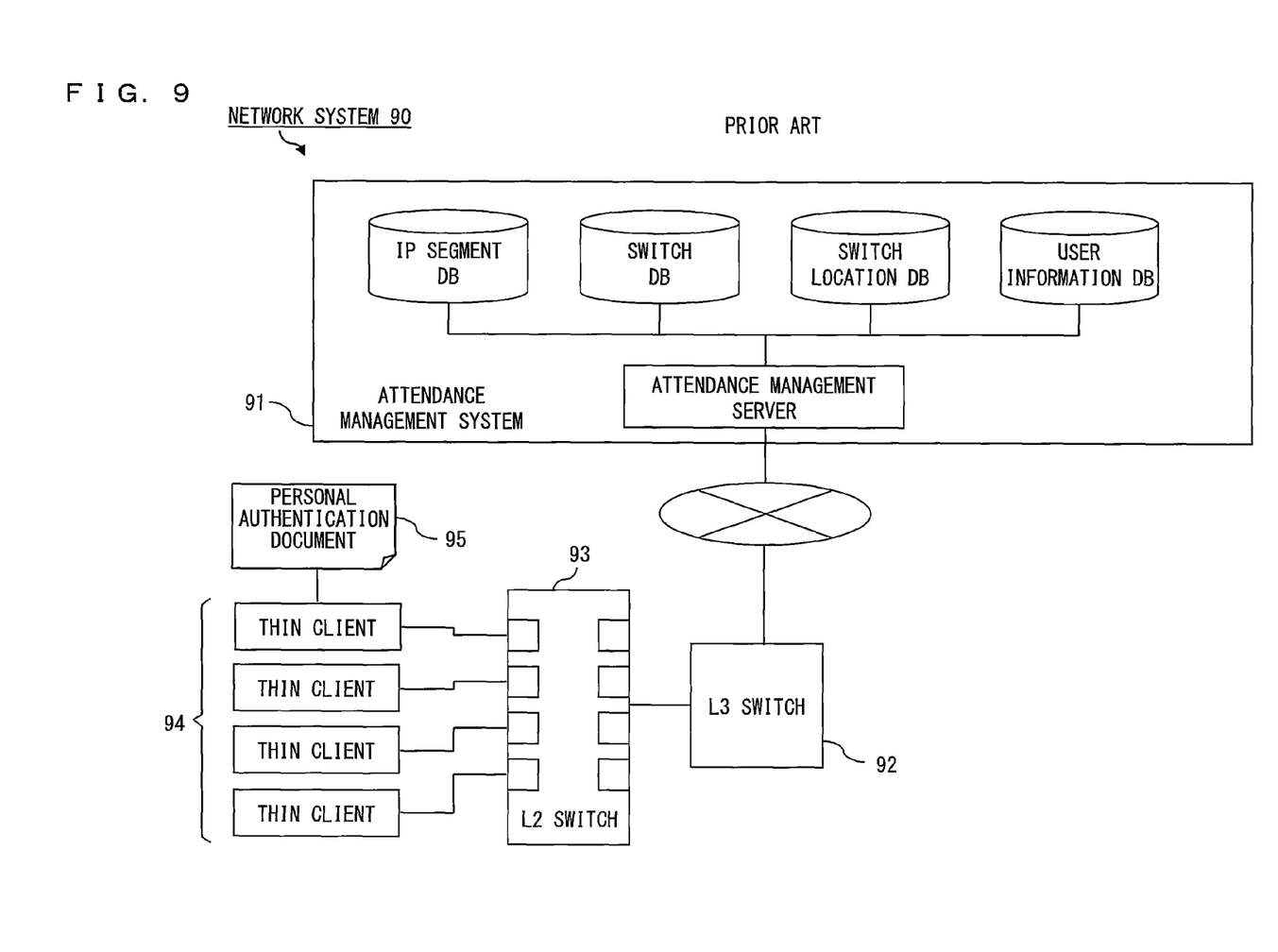
FIG. 9 shows a network system 90 in conventional art.

FIG. 9 shows a network system 90 in conventional art. In FIG. 9, the network system 90 includes an attendance management system 91, an L3 switch 92, an L2 switch 93, and a plurality of thin clients 94. As shown in FIG. 9, the attendance management system 91 includes an attendance management server, an IP segment DB, a switch DB, a switch location DB, and user information DB; and performs user authentication by using a personal authentication document 96.

When performing the user authentication using the personal authentication document 96, the attendance management server in the attendance management system 91 identifies the user who is using a computer (either one of the thin clients 94) by using unique user-identifiers that are stored.

Furthermore, the attendance management server acquires a MAC address of the computer used by the user based on an IP address of the computer, by using the L3 switch 92 which is capable of acquiring information from an address mapping table.

In addition, based on the acquired MAC address, the attendance management server acquires a port number of the L2 switch 93 connected to the computer used by the user.

As described above, the attendance management system 91 identifies the user's seat location based on information representing a relationship of connection locations of the L2 switch 93 and the respective thin clients 94, by referring to the DB stored in advance.

However, usage the above described conventional network system is limited to Ethernet (registered trademark) networks, and it has been necessary to use a specific network configuration. Therefore, the conventional network system has a problem where it does not correctly function in a network configuration such as, for example, FTTH (Fiber To The Home) service that uses GE-PON (Gigabit Ethernet (registered trademark) Passive Optical Network) method and includes repeaters whose port numbers cannot be identified.

SUMMARY OF THE INVENTION

Therefore, an objective of the present invention is to provide a server and a network system for identifying, even in a network including repeaters whose port numbers cannot be identified, an installed location of each terminal based on differentiating information of each of the terminals and on an RTT (Round Trip Time) or a transmission delay time required between the server and each of the terminals.

In order to achieve the above described objective, the server of the present invention is a server for differentiating among a plurality of terminals connected via a network. The server includes: a storage section for pre-storing information as to routes between the server and each of the plurality of terminals; a transmission/reception section for transmitting messages to the plurality of terminals and receiving response messages from the plurality of terminals via the network; a terminal information acquisition section for, based on the response messages from the plurality of terminals received by the transmission/reception section, acquiring information differentiating the terminals and acquiring delay times for transmission between the server and each of the plurality of terminals; a transmission distance calculation section for calculating transmission distances between the server and each of the plurality of terminals, based on the transmission delay times acquired by the terminal information acquisition section; and a terminal installation location identifying section for identifying locations where the terminals are installed, based on the differentiating information acquired by the terminal information acquisition section, the transmission distances calculated by the transmission distance calculation section, and the route information stored in the storage section.

Preferably, the transmission distances are relative distances between the server and each of the plurality of terminals.

Preferably, the differentiating information consists of MAC addresses of the plurality of terminals.

In order to achieve the above described objective, the network system of the present invention is a network system including a plurality of terminals, a server for differentiating among the plurality of terminals, and a repeater connected to the server via a main transmission line and connected to the plurality of terminals via a plurality of sub transmission lines branching from the main transmission line in correspondence to the plurality of terminals. The server includes: a storage section for pre-storing information as to routes between the server and each of the plurality of terminals; a transmission/reception section for transmitting messages to the plurality of terminals and receiving response messages from the plurality of terminals via the repeater; a terminal information acquisition section for acquiring information differentiating the terminals and acquiring delay times for transmission between the server and each the plurality of terminals, based on the response messages from the plurality of terminals received by the transmission/reception section; a transmission distance calculation section for calculating transmission distances between the server and each of the plurality of terminals, based on the transmission delay times acquired by the terminal information acquisition section; and a terminal installation location identifying section for identifying locations where the terminals are installed, based on the differentiating information acquired by the terminal information acquisition section, the transmission distances calculated by the transmission distance calculation section, and the route information stored in the storage section.

Preferably, the transmission distances are relative distances between the server and each of the plurality of terminals.

Preferably, the differentiating information consists of MAC addresses of the plurality of terminals.

The respective transmission distances between the server and the plurality of terminals are different from each other.

Furthermore, the repeater is an optical splitter.

Furthermore, the network system further includes a converter disposed between the server and the repeater for conversions between electrical signals and optical signals. The transmission delay times are delay times required for transmission and reception of messages between the converter and the plurality of terminals.

Furthermore the locations where the plurality of terminals are installed are locations of seats installed in an airplane.

A method of the present invention for achieving the above described objective is a method executed by a server for differentiating among a plurality of terminals connected via a network. The method includes: a transmission/reception step of transmitting messages to the plurality of terminals and receiving response messages from the plurality of terminals via the network; a terminal information acquisition step of acquiring information differentiating the terminals and acquiring delay times for transmission between the server and each of the plurality of terminals, based on the response messages from the plurality of terminals received at the transmission/reception step; a transmission distance calculation step of calculating transmission distances between the server and each of the plurality of terminals, based on the transmission delay times acquired at the terminal information acquisition step; and a terminal installation location identifying step of identifying locations where the terminals are installed, based on the differentiating information acquired at the terminal information acquisition step, the transmission distances calculated at the transmission distance calculation step, and information pre-stored in a memory regarding routes between the server and each the plurality of terminals.

Furthermore, processes performed by each component of the server of the present invention to achieve the above described objective can be considered as a method that provides a series of process steps. This method may be provided in a form of a program that causes a computer to execute the series of process steps. This program may be installed on the computer as being stored in a computer readable storage medium.

As described above, the server and network system of the present invention allow identifying the installed location of each of the terminals based on the differentiating information of each of the terminals and on the RTT (Round Trip Time) or the transmission delay time required between the server and each of the terminals, even in a network including repeaters whose port numbers cannot be identified.

As a result, for example when terminals are installed at all the seats in a cabin and if an operation is performed or if a malfunction occurs at a terminal installed at one of the seats, an association between a communication address and an installed location of the terminal can be made without the need of a special procedure. Therefore, for example, an installed location (seat location) of the operated terminal and an installed location (seat location) of a terminal of a party who has been called can be identified.

The present invention is applicable to a server, a network system, and the like for identifying installed locations of a plurality of terminals that are connected via a network. In particular, when applied to terminals installed in all the seats in a passenger transportation vehicle such as an airplane, the present invention is useful for identifying a position of a seat at which a malfunction has occurred, and identifying a seat location of a caller in a situation where communications between terminal is conducted or where a flight attendant has been called.

These and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of the present invention will be described in the following with reference to the drawings. Descriptions are provided in the following by using, as one example of the embodiment of the present invention, an in-flight entertainment system allowing viewing and listening to contents such as music and movies distributed from a server, calling a flight attendant, and controlling the lighting installed in the ceiling portion, by a use of a terminal installed to each of the seats in a vehicle such as an airplane.

Figure 1:
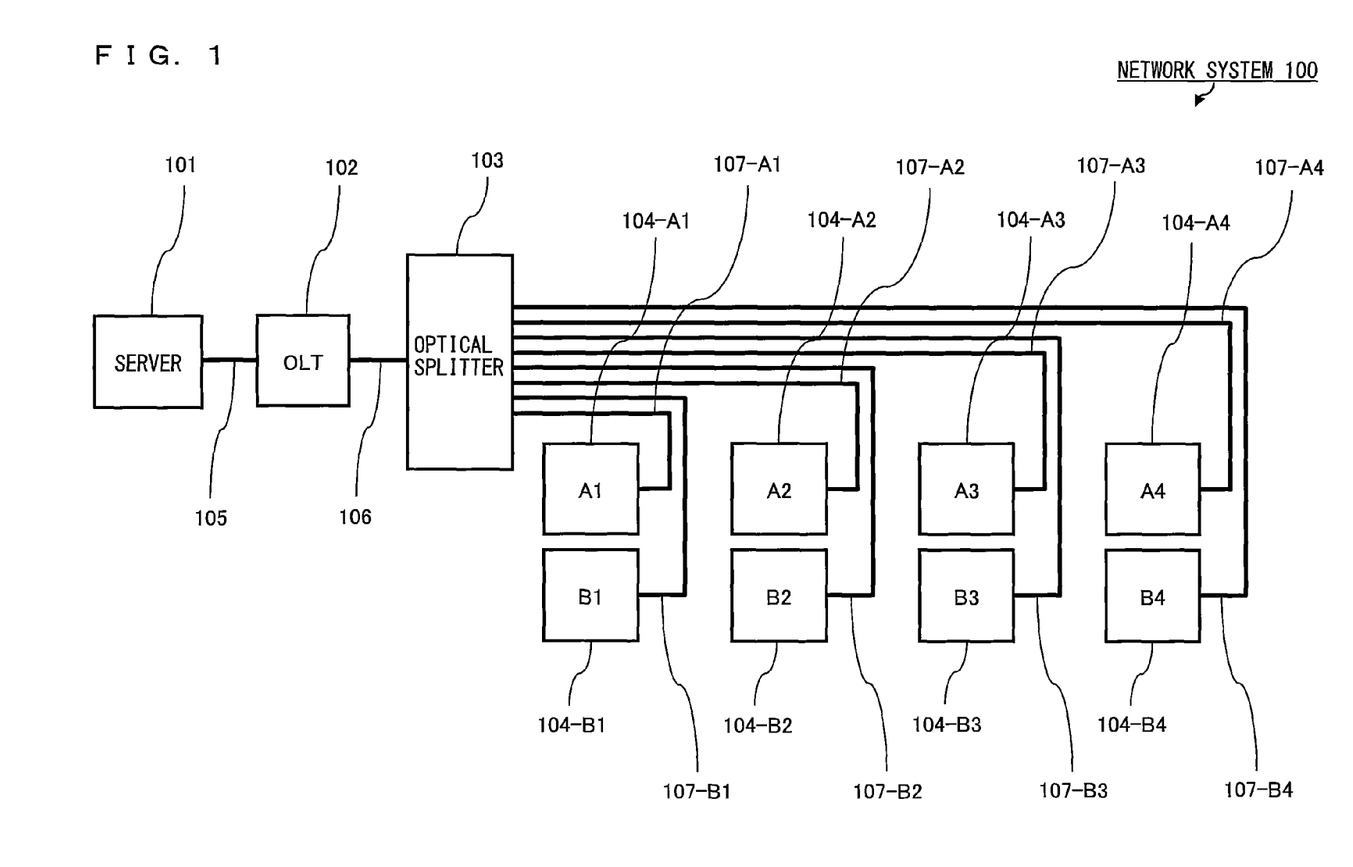
FIG. 1 is a block diagram showing a network system 100 according to one embodiment of the present invention.

FIG. 1 is a block diagram showing a network system 100 according to the one embodiment of the present invention. In FIG. 1, the network system 100 includes a server 101, an OLT (Optical Line Terminal) 102, an optical splitter 103, and terminals 104-A1 to 104-A4 and 104-B1 to 104-B4.

In addition, the server 101 and the OLT 102 are connected via an Ethernet (registered trademark) cable 105. The OLT 102 and the optical splitter 103 are connected via a fiber-optic cable 106 (main transmission line). The optical splitter 103 and each of the terminals 104-A1 to 104-A4 and 104-B1 to 104-B4 are respectively connected via fiber-optic cables 107-A1 to 107-A4 and 107-B1 to 107-B4 (sub transmission lines).

The server 101 differentiates among, manages, and controls the terminals 104-A1 to 104-A4 and 104-B1 to 104-B4 connected to the server 101 via the network.

In the one embodiment of the present invention, GE-PON method is used as one example of the network connecting the server 101 and each of the terminals 104-A1 to 104-A4 and 104-B1 to 104-B4. The OLT 102 is, for example, a server side terminating device for a network using the GE-PON method, and performs conversions between electrical signals and optical signals. It should be noted that, here, the GE-PON method has a gigabit level communication speed, and enables sharing a single core fiber-optic cable with multiple users as a result of branching a single optical signal into multiple optical signals by using the optical splitter 103 which is a passive device.

The optical splitter 103 is a repeater that branches optical signals in the downbound direction from the server 101 to the terminals 104-A1 to 104-A4 and 104-B1 to 104-B4, and that combines optical signals in the upbound direction from the terminals 104-A1 to 104-A4 and 104-B1 to 104-B4 to the server 101, simultaneously.

The terminals 104-A1 to 104-A4 and 104-B1 to 104-B4 are respectively installed at seats A1 to A4 and B1 to B4. The terminals 104-A1 to 104-A4 and 104-B1 to 104-B4 are, for example, remote control units or control panels controlled by passengers in order to receive various services, and monitor terminals for listening to music or watching movies. It should be noted that specific MAC addresses are assigned respectively to the terminals 104-A1 to 104-A4 and 104-B1 to 104-B4.

In order to enable smooth data communication while avoiding collisions of communication, the GE-PON method described in the one embodiment of the present invention uses, for example, technologies including WDM (Wavelength Division Multiplexing), TDM (Time Division Multiplexing), and TDMA (Time Division Multiple Access).

Specifically, used here is the WDM technology which assigns different light wavelengths to a downbound direction communication (from the OLT 102 to the terminals 104-A1 to 104-A4 and 104-B1 to 104-B4) and to an upbound direction communication (from the terminals 104-A1 to 104-A4 and 104-B1 to 104-B4 to the OLT 102). With this, simultaneous transmission and reception of signals (messages) in both downbound direction and upbound direction are possible by using the single core fiber-optic cables 107.

In addition, the TDM technology is used in the downbound direction communications. As a result, the communications from the OLT 102 to each of the terminals are multiplexed and sent out to avoid temporal overlapping. In this case, data is branched by the optical splitter 103 and identical data are transmitted to the terminals 104-A1 to 104-A4 and 104-B1 to 104-B4 connected to the same network. Therefore, the OLT 102 assigns an LLID identifier to each of the terminals in order to differentiate each of the terminals, and embeds a destination LLID to a header in each transmission frame. Then, each of the terminals decides whether or not to use a received frame by determining if it is a message for another terminal or a message for oneself through verification of the LLID in the received frame.

On the other hand, in the upbound direction communications, data from multiple terminals are combined by the optical splitter 103. Therefore, when the data are transmitted from each of the terminals in a disorderly manner, the data may collide on a transmission line. Thus, by using the TDMA technology, the OLT 102 controls the amount of transmission and the timing at which the terminals 104-A1 to 104-A4 and 104-B1 to 104-B4 transmit the data. As a result, collisions among data transmitted from each of the terminals are prevented from happening on the transmission line.

Figure 2:
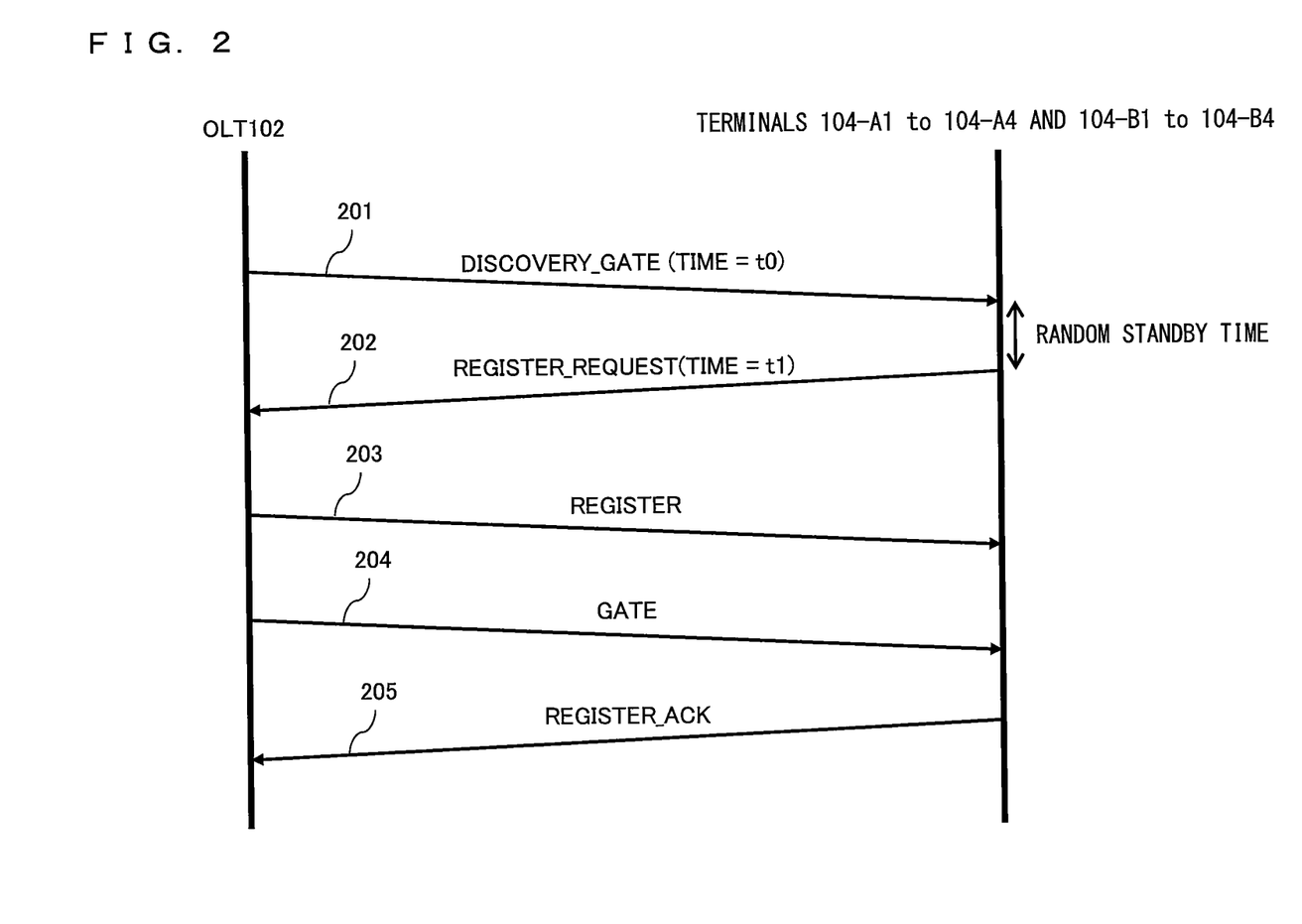
FIG. 2 shows a sequence in which communication links are established respectively between an OLT (Optical Line Terminal) 102 and terminals 104-A1 to 104-A4 and 104-B1 to 104-B4 in the network system 100 according to the one embodiment of the present invention.

FIG. 2 shows a sequence in which communication links are established respectively between the OLT 102 and the terminals 104-A1 to 104-A4 and 104-B1 to 104-B4 in the network system 100 according to the one embodiment of the present invention.

First, the OLT 102 transmits a DISCOVERY_GATE message 201 to all the terminals (terminals 104-A1 to 104-A4 and 104-B1 to 104-B4) at an arbitrary timing. It should be noted that a Broadcast_LLID (Logical Link ID) is set in the DISCOVERY_GATE message 201.

Each of the terminals 104-A1 to 104-A4 and 104-B1 to 104-B4 that has received the DISCOVERY_GATE message 201 returns a REGISTER_REQUEST message 202 to the OLT 102 after standing by for a random time set for each of the terminals in order to avoid collisions in the upbound direction communications from each of the terminals to the OLT 102 (the server 101).

The REGISTER_REQUEST message 202 includes a MAC address of a terminal, and time information such as the time when the terminal has received the DISCOVERY_GATE message 201, random time, or the time when the terminal will transmit the REGISTER_REQUEST message 202.

Upon receiving the REGISTER_REQUEST message 202, the OLT 102 assigns an LLID to the terminal that transmitted the REGISTER_REQUEST message 202.

Next, the OLT 102 transmits a REGISTER message 203 to the terminal. The REGISTER message 203 includes information indicating that an LLID has been assigned to the terminal.

Furthermore, the OLT 102 (the server 101) transmits a GATE message 204 to the terminal. The GATE message 204 is for notifying the terminal regarding a permit to transmit to the OLT 102, and includes information identifying a message transmission timing for the terminal in order to avoid a collision between communications in the upbound and downbound directions and avoid a communication collision with messages transmitted and received by other terminals.

The terminal that has received the GATE message 204 returns a REGISTER_ACK message 205 to the OLT 102.

Furthermore, the OLT 102 acquires a transmission delay time between the OLT 102 and the terminal, based on the time information included in the received REGISTER_REQUEST message 202. A method for acquiring the transmission delay time between the OLT 102 and each of the terminals 104-A1 to 104-A4 and 104-B1 to 104-B4 will be described in detail in the following by using an example.

Figure 3:
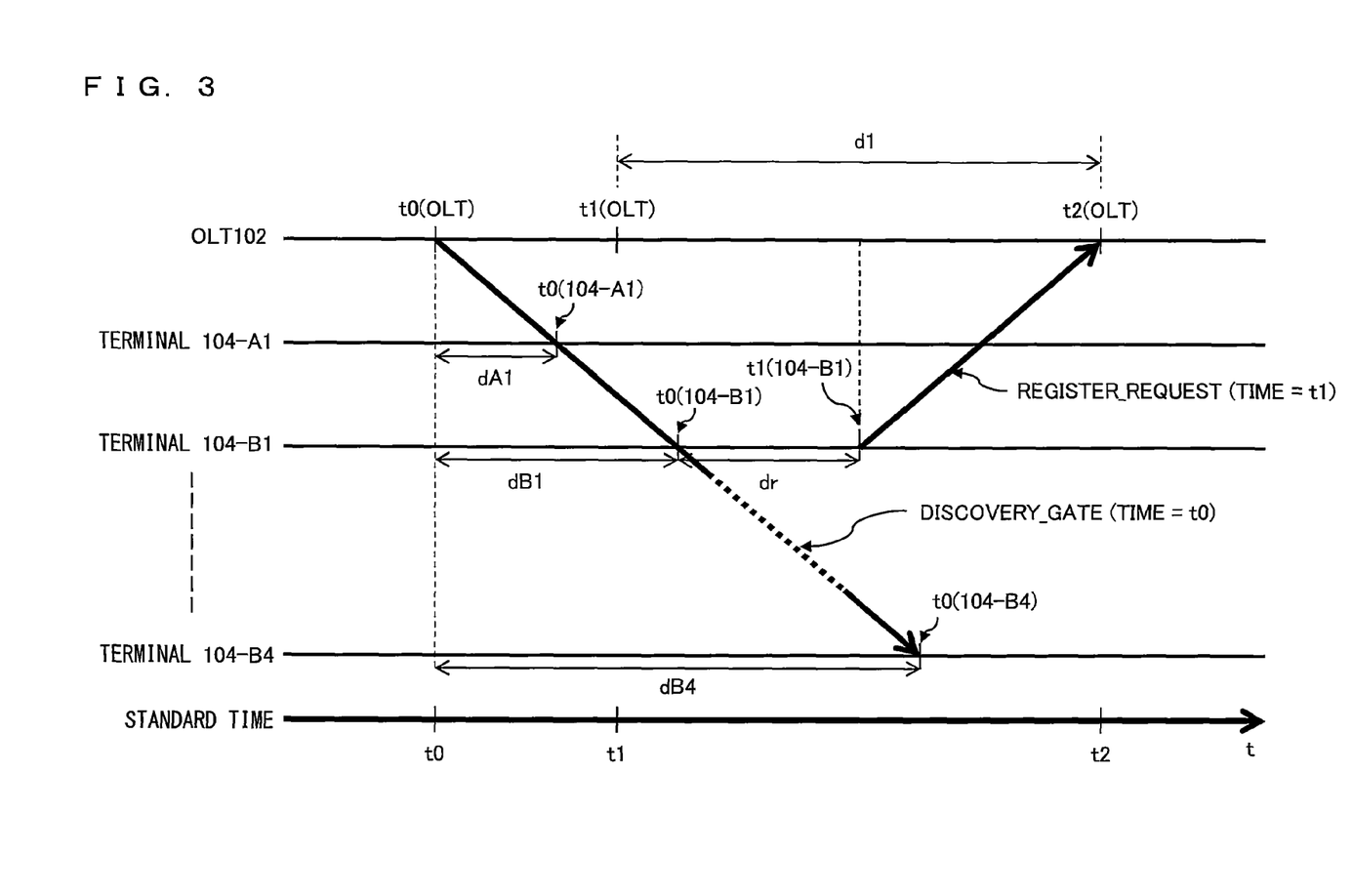
FIG. 3 is a timing chart figure that describes a communication status of a message transmitted and received between the OLT 102 and the terminals 104-A1 to 104-A4 and 104-B1 to 104-B4 in the network system 100 according to the one embodiment of the present invention.

FIG. 3 is a timing chart figure that describes a communication status of a message transmitted and received between the OLT 102 and each of the terminals 104-A1 to 104-A4 and 104-B1 to 104-B4 in the network system 100 according to the one embodiment of the present invention.

In FIG. 3, the horizontal axes described as "OLT 102," "terminal 104-A1," "terminal 104-B1," and "terminal 104-B4" represent time-axes of the OLT 102 and respective terminals. For example, a time point at which an internal clock in the OLT 102 indicates time t0 is represented as t0 (OLT), and similar descriptions are used with respect to other terminals for internal clocks thereof.

First, at the time point when the internal clock of the OLT 102 is time t0 (t0 (OLT)), the OLT 102 transmits a DISCOVERY_GATE message including time information t0. Since the destination of the DISCOVERY_GATE message is set as Broadcast_LLID as described above, it is received by all the terminals 104-A1 to 104-A4 and 104-B1 to 104-B4.

For example, the terminal 104-B1 receives the DISCOVERY_GATE message (TIME=t0) after transmission time dB1 has elapsed since time t0 (OLT). The terminal 104-B1 that received the DISCOVERY_GATE message (TIME=t0) sets the time information t0 (OLT) included in the DISCOVERY_GATE message (TIME=t0) to t0 (104-B1) of an internal clock.

Then, at a time point when random time dr has elapsed since t0 (104-B1) to obtain time t1 (104-B1), the terminal 104-B1 returns, to the OLT 102, a REGISTER_REQUEST message (TIME=t1) including time information t1.

The OLT 102 receives the REGISTER_REQUEST message (TIME=t1) after transmission time dB1 has elapsed since time t1 (104-B1). Upon receiving the REGISTER_REQUEST message (TIME=t1), the OLT 102 calculates difference d1 between time information t1 included in the REGISTER_REQUEST message and t2 (OLT) obtained from the internal clock of the OLT 102.

Specifically, calculations are conducted as shown below (Numeral 1).

$$d1 = t2(OLT) - t1(OLT)$$
$$= \{t1(104 - B1) + dB1\} - t1(OLT)$$
$$= [\{t1(OLT) + dB1\} + dB1] - t1(OLT)$$
$$= 2dB1$$
(Numeral 1)

As described above, transmission delay time dB1 can be obtained based on the difference between the time information included in the REGISTER_REQUEST message (TIME=t1) and the time of the internal clock of the OLT 102.

Transmission delay times (dA1 and dB4) for other terminals 104-A1 and 104-B4 can be obtained from a similar calculation method.

Figure 4:
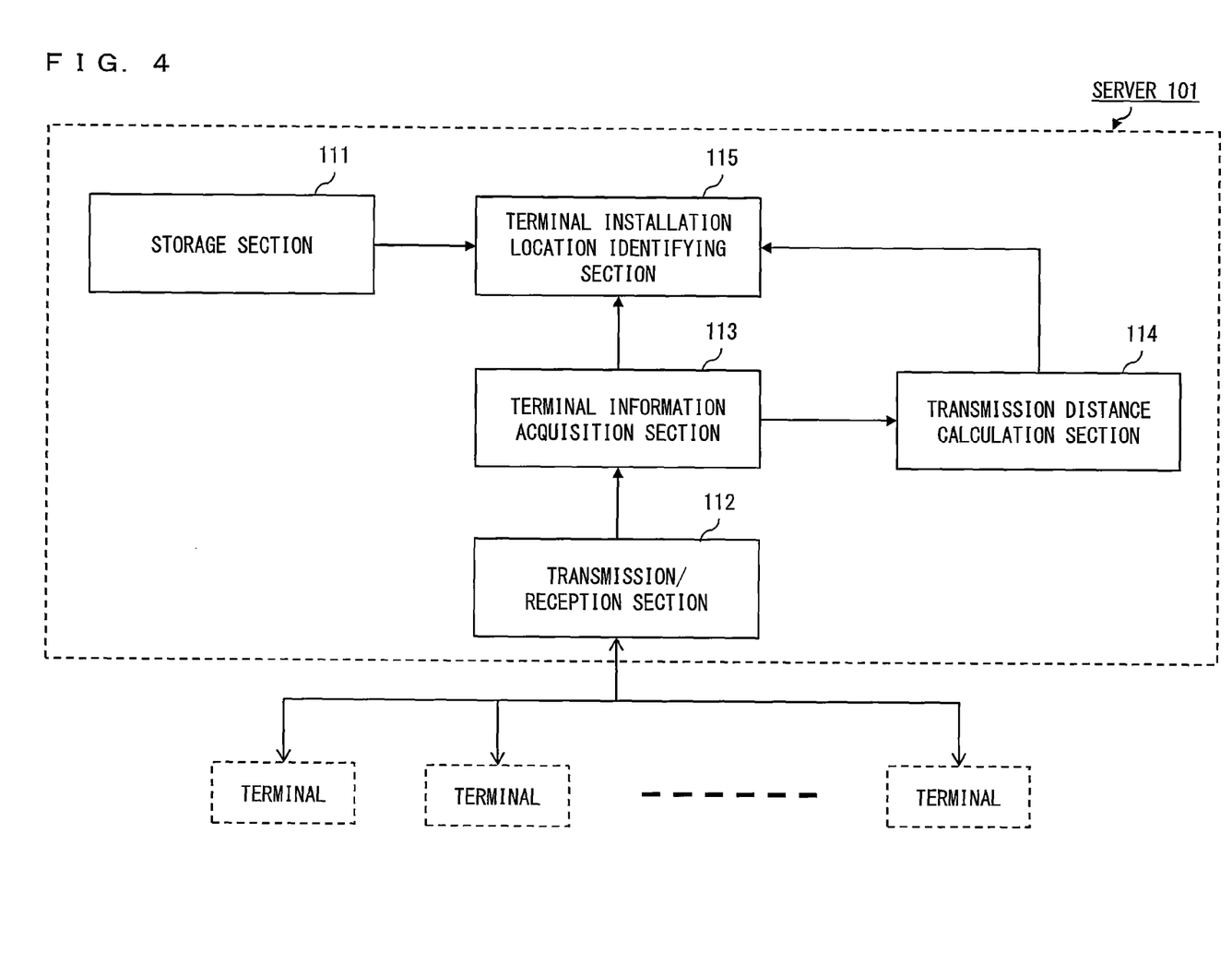
FIG. 4 is a functional block diagram showing details of a server 101 in the network system 100 according to the one embodiment of the present invention.

FIG. 4 is a functional block diagram showing details of the server 101 in the network system 100 according to the one embodiment of the present invention. In FIG. 4, the server 101 includes a storage section 111, a transmission/reception section 112, a terminal information acquisition section 113, a transmission distance calculation section 114, and a terminal installation location identifying section 115.

Information regarding routes between the server 101 and each of the plurality of terminals are stored in the storage section 111 in advance. The contents stored in the storage section 111 will be described in detail by using FIG. 5 to FIG. 8 described later.

The transmission/reception section 112 transmits messages to the plurality of terminals and receives response messages from the plurality of terminals via the network. Here, the messages transmitted by the plurality of terminals include, for example, the DISCOVERY_GATE messages and the like which are described using FIG. 2 and FIG. 3. Furthermore, the response messages include, for example, the REGISTER_REQUEST messages and the like which are described using FIG. 2 and FIG. 3.

The terminal information acquisition section 113 acquires differentiating information terminals and delay times for transmission between the server 101 and each of the plurality of terminals, based on the response messages from the plurality of terminals received by the transmission/reception section 112. Representatively, the differentiating information of the plurality of terminals consists of MAC addresses of the respective terminals. Furthermore, the transmission delay times can be obtained by using the calculation method described by using FIG. 3.

The transmission distance calculation section 114 calculates transmission distances between the server 101 and each of the plurality of terminals, based on the transmission delay times acquired by the terminal information acquisition section 113. The relationship between the transmission delay times and the transmission distances will be described in detail in the following.

The terminal installation location identifying section 115 identifies locations where the terminals are installed, based on the differentiating information acquired by the terminal information acquisition section 113, the transmission distances calculated by the transmission distance calculation section 114, and the route information stored in the storage section 111.

Figure 5:
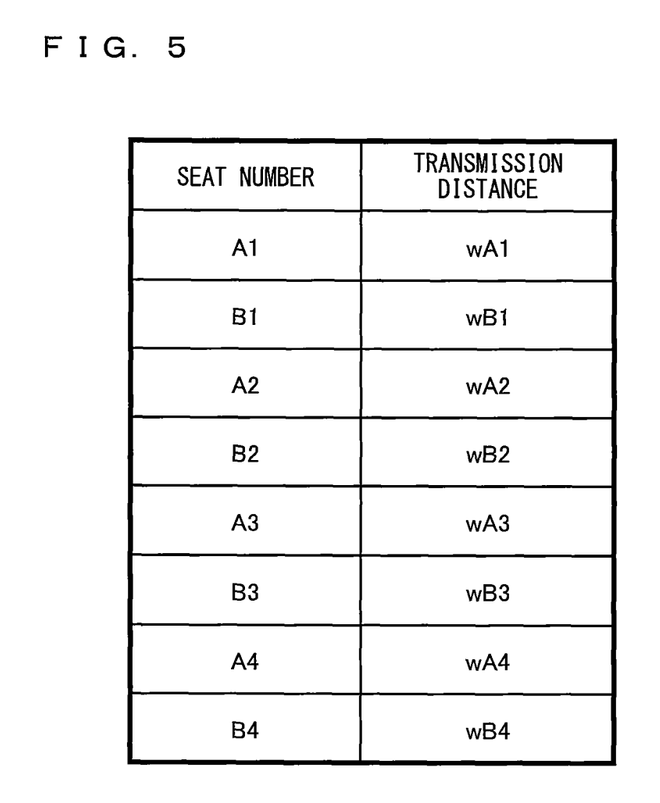
FIG. 5 shows one example of a terminal arrangement table indicating transmission distances that are from the server 101 to respective seats and that correspond to respective seat numbers, in the network system 100 according to the one embodiment of the present invention.

FIG. 5 shows one example of a terminal arrangement table indicating transmission distances that are from the server 101 to respective seats and that correspond to respective seat numbers, in the network system 100 according to the one embodiment of the present invention. The terminal arrangement table shown in FIG. 5 is stored in the storage section 111 of the server 101 in advance.

Here, representatively, the lengths of the fiber-optic cables 107-A1 to 107-A4 and 107-B1 to 107-B4 are respectively different from each other as shown in FIG. 1. Each of the transmission distances (i.e., each of the transmission distances between the server 101 and the plurality of terminal) shown in FIG. 5, satisfies the following relationship (Numeral 2).

$$wA1 < wB1 < wA2 < wB2 < wA3 < wB3 < wA4 < wB4 \quad \text{(Numeral 2)}$$

It should be noted that each of the transmission distances shown in FIG. 5 may be a physical absolute distance, or may be a relative distance determined relatively among the terminals.

Figure 6:
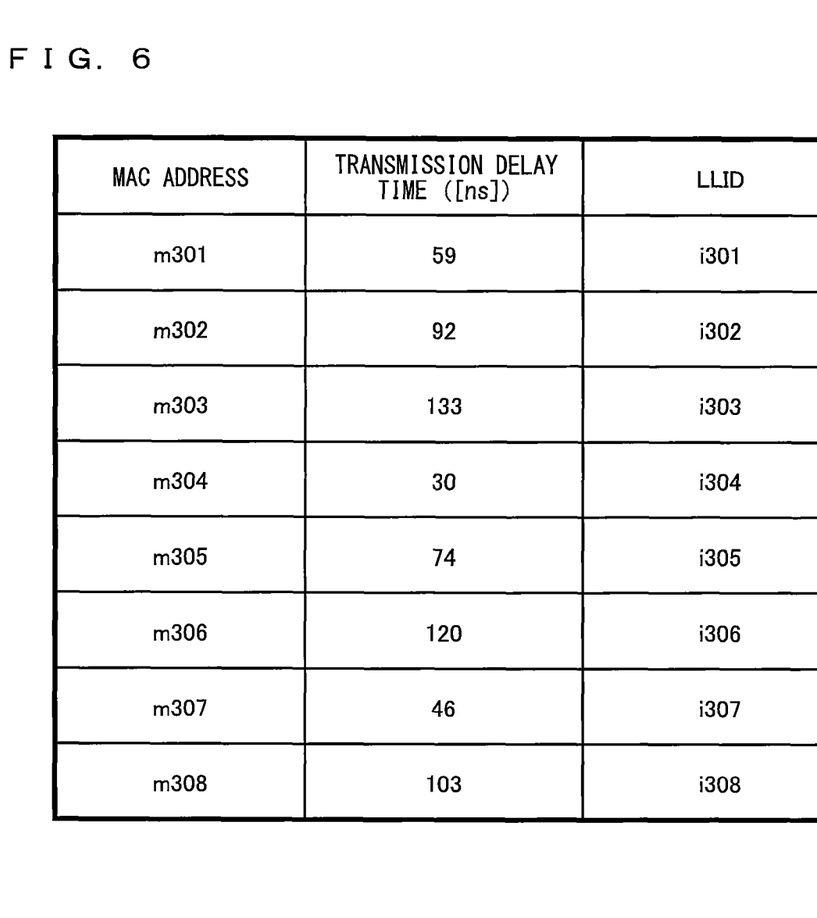
FIG. 6 shows one example of a terminal control table indicating LLID (Logical Link ID) assigned in correspondence to delay times and MAC addresses of respective terminals installed to the respective seats, in the network system 100 according to the one embodiment of the present invention.

FIG. 6 shows one example of a terminal control table indicating LLID assigned in correspondence to delay times and MAC addresses of respective terminals respectively installed to the seats, in the network system 100 according to the one embodiment of the present invention.

For example, the OLT 102 calculates the transmission delay times by using Numeral 1 described above, based on the time information included in the REGISTER_REQUEST message received from each of the terminals. Furthermore, the OLT 102 assigns an LLID to a terminal that has transmitted the REGISTER_REQUEST message.

Here, LLID=i301 is assigned to a terminal having MAC address=m301 and having transmission delay time=59 ns required from the OLT 102. Furthermore, LLID=i302 is assigned to a terminal having MAC address=m302 and having transmission delay time=92 ns required from the OLT 102. Similarly, LLID is further assigned to each of the terminal as shown in FIG. 6.

Then, the server 101 acquires the terminal control table shown in FIG. 6 from the OLT 102, rearranges the terminal control table in order of the transmission delay times, and matches the rearranged terminal control table to the terminal arrangement table (in order of transmission distances) that is stored in the storage section 111 in advance and shown in FIG. 5.

Figure 7:
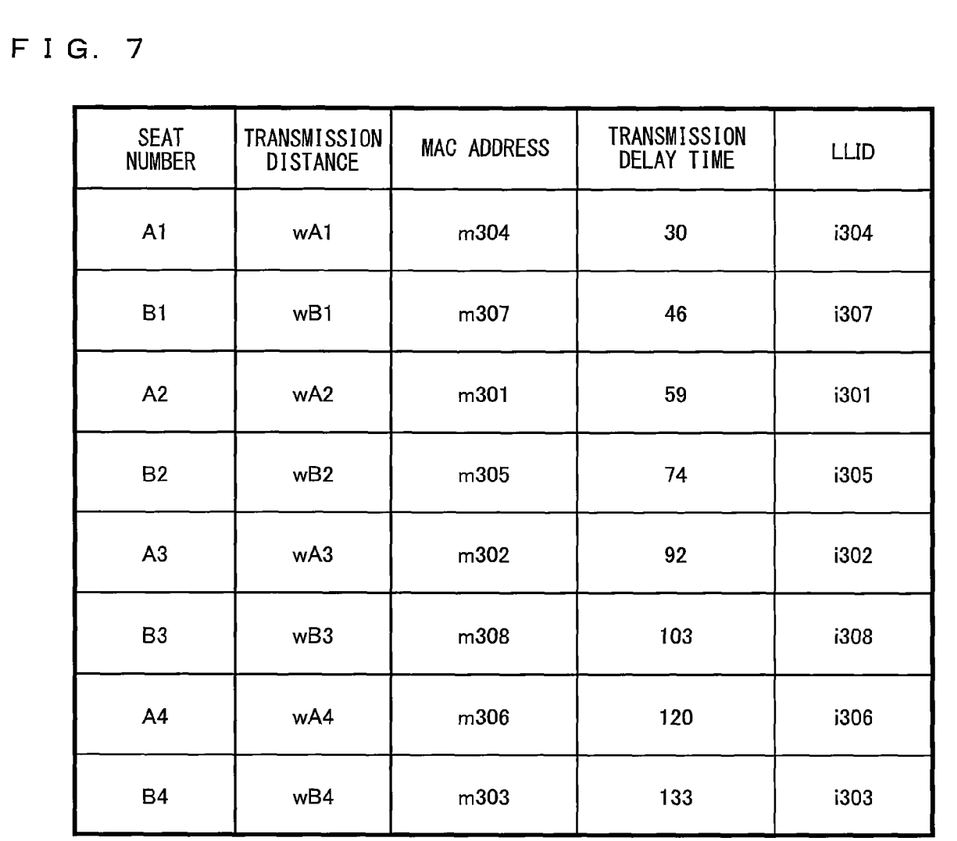
FIG. 7 shows one example of a terminal-seat location control table obtained by matching the terminal arrangement table shown in FIG. 5 and the terminal control table shown in FIG. 6, in the network system 100 according to the one embodiment of the present invention.

FIG. 7 shows one example of a terminal-seat location control table obtained by matching the terminal arrangement table shown in FIG. 5 and the terminal control table shown in FIG. 6, in the network system 100 according to the one embodiment of the present invention. FIG. 7 indicates a result of the matching and includes seat numbers, transmission distances, MAC addresses, transmission delay times, and LLID. With this, a MAC address of a terminal installed in each of the seats can be differentiated.

In other words, it can be understood that, a terminal having MAC address=m304 and transmission delay time=30 ns which is the shortest among those shown in FIG. 6, and having transmission distance=wA1 which is the shortest among those shown in FIG. 5, is installed at seat number A1. In addition, a terminal having MAC address=m307 and transmission delay time=46 ns which is the second shortest, and having a transmission distance=wB1 which is the second shortest, is installed at seat number B1. Similarly, a MAC address of a terminal installed in each of the seats can be differentiated as shown in FIG. 7.

Figure 8:
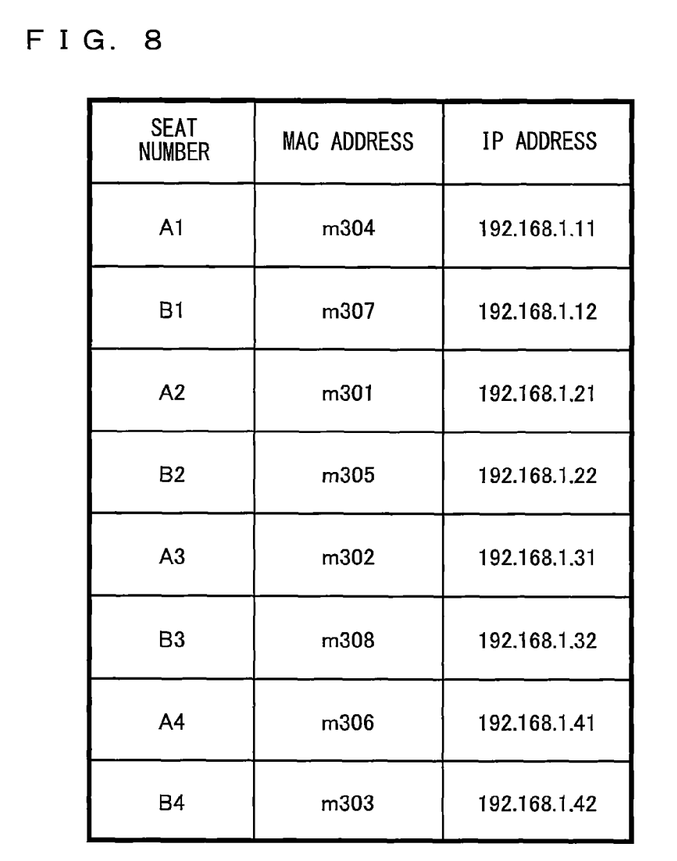
FIG. 8 shows one example of an IP address assignment table showing IP addresses assigned respectively in correspondence to the terminals installed to respective seats, in the network system 100 according to the one embodiment of the present invention.

Furthermore, the server 101 may assign IP addresses in accordance with the seat locations after differentiating the terminals that are respectively installed to the seats. FIG. 8 shows one example of an IP address assignment table showing IP addresses assigned respectively in correspondence to the terminals installed to the respective seats, in the network system 100 according to the one embodiment of the present invention.

For example, an IP address "192.168.1.11" is assigned to the terminal at seat number A1 having MAC address=m304; and an IP address "192.168.1.12" is assigned to the terminal at seat number B1 having MAC address=m307. IP addresses are sequentially assigned to other terminals as shown in FIG. 8.

With this, for example, when a passenger sitting at seat number B3 pushes a button to call a crew member, an IP address "192.168.1.32" of the caller's terminal is notified to the server 101. The server 101 can detect that the call has been made from seat number B3 by referring to the IP address assignment table shown in FIG. 8.

As described above, the network system 100 and the server 101 according to the one embodiment of the present invention can identify the installed locations of each of the terminals based on the differentiating information of each of the terminals and the RTT or the transmission delay time required between the server 101 (the OLT 102) and each of the terminals, even in a network including repeaters whose port numbers cannot be differentiated. In more detail, the server 101 can differentiate a terminal installed at each of the seats by matching, to route information stored in advance, the MAC address and the transmission delay time which are differentiating information of each of the terminals.

It should be noted that, in the one embodiment of the present invention, although the fiber-optic cable 106, which is a single cable, is connecting the OLT 102 and the optical splitter 103, and is branched to eight cables by the optical splitter 103 as shown in FIG. 1, the present invention is not limited thereto. For example, the OLT 102 may include a plurality of optical ports to which a plurality of corresponding fiber-optic cables are connected, and a plurality of optical splitters may be connected in a multi-stage manner to each of the fiber-optic cables.

Furthermore, in the one embodiment of the present invention, although the optical splitter 103 with eight branches has been used in accordance with the number of terminals included in the network system 100, the present invention is not limited thereto; and optical splitters with various numbers of branches may be used in accordance with the configuration of the network system.

Furthermore, although described in the one embodiment of the present invention is a procedure in which the transmission delay times are acquired based on the time information included in the message obtained upon establishment of the communication link, the procedure for acquiring the transmission delay times is not limited thereto; and, for example, a procedure in which the transmission delay times are acquired separately after the establishment of the communication link may be used.

It should be noted that, in the one embodiment present invention, although an in-flight entertainment system for use in airplanes is described as the example, the present invention is not limited thereto; and the present invention is applicable to, for example, conference rooms, trains, and buses having terminals installed at all the seats.

While the invention has been described in detail, the foregoing description is in all aspects illustrative and not restrictive. It will be understood that numerous other modifications and variations can be devised without departing from the scope of the invention.

What is claimed is:

1. A server for differentiating among a plurality of network-connected terminals each installed in a given location, the server comprising:

a storage section pre-storing a table in which server—terminal transmission distances are respectively associated with each of the locations where the terminals are installed;

a transmission/reception section configured to transmit messages to, and receive response messages from, the terminals via the network;

a terminal information acquisition section configured to, based on the response message received from each of the terminals by the transmission/reception section, acquire identification information identifying the terminals individually, and acquire respectively for each of the terminals delay times for round-trip or one-way transmission between the server and each terminal; and a terminal installation location-identifying section configured to correlate the transmission delay times with the server—terminal transmission distances to match the acquired transmission delay times with the server—terminal transmission distances in the pre-stored table, and specify the identification information corresponding to the matched transmission delay times, as information identifying which terminal is installed in the respective installation locations associated with the transmission distances in the pre-stored table; wherein:

in matching transmission delay times with server—terminal transmission distances, the terminal installation location-identifying section associates the transmission delay times with the transmission distances such that the transmission distances in order of length correspond with the transmission delay times in order of length.

2. The server according to claim 1, wherein the transmission distances are relative distances between the server and each of the plurality of terminals.

3. The server according to claim 1, wherein the identification information consists of MAC addresses of the plurality of terminals.

4. A network system comprising a plurality of terminals each installed in a given location, a server for differentiating among the plurality of terminals, and a repeater connected to the server via a main transmission line and connected to the plurality of terminals via a plurality of sub-transmission lines branching from the main transmission line in correspondence to the plurality of terminals, the server including:

a storage section pre-storing a table in which server—terminal transmission distances are respectively associated with each of the locations where the terminals are installed;

a transmission/reception section configured to transmit messages to, and receive response messages from, the terminals via the repeater;

a terminal information acquisition section configured to, based on the response message received from each of the terminals by the transmission/reception section, acquire identification information identifying the terminals individually, and acquire respectively for each of the terminals delay times for round-trip or one-way transmission between the server and each terminal; and a terminal installation location-identifying section configured to correlate the transmission delay times with the server—terminal transmission distances to match the acquired transmission delay times with the server—terminal transmission distances in the pre-stored table, and specify the identification information corresponding to the matched transmission delay times, as information identifying which terminal is installed in the respective installation locations associated with the transmission distances in the pre-stored table; wherein:

in matching transmission delay times with server—terminal transmission distances, the terminal installation location-identifying section associates the transmission delay times with the transmission distances such that the transmission distances in order of length correspond with the transmission delay times in order of length.

5. The network system according to claim 4, wherein the transmission distances are relative distances between the server and each of the plurality of terminals.

6. The network system according to claim 4, wherein the identification information consists of MAC addresses of the plurality of terminals.

7. The network system according to claim 4, wherein the transmission distances between the server and each of the plurality of terminals are different from each other.

8. The network system according to claim 4, wherein the repeater is an optical splitter.

9. The network system according to claim 4, further comprising a converter disposed between the server and the repeater, for conversions between electrical signals and optical signals; wherein the transmission delay times are delay times required for transmission and reception of messages between the converter and the plurality of terminals.

10. The network system according to claim 4, wherein the installation locations are information representing seats installed in an airplane.

11. A method, executed by a server, for differentiating among a plurality of network-connected terminals each installed in a given location, the method including:

a transmission/reception step of transmitting messages to, and receiving response messages from, the terminals via the network;

a terminal information acquisition step of, based on the response message received from each of the terminals in the transmission/reception step, acquiring identification information identifying the terminals individually, and acquiring respectively for each of the terminals delay times for round-trip or one-way transmission between the server and each terminal; and a terminal installation location-identifying step of correlating transmission delay times with transmission distances by matching the acquired transmission delay times with server—terminal transmission distances in a table of server—terminal transmission distances respectively associated with each of the locations where the terminals are installed, and specifying the identification information corresponding to the matched transmission delay times, as information identifying which terminal is installed in the respective installation locations associated with the transmission distances in the table; wherein:

in the terminal installation location-identifying step, in matching transmission delay times with server—terminal transmission distances, the transmission delay times are associated with the transmission distances such that the transmission distances in order of length correspond with the transmission delay times in order of length.

* * * * *